United States Patent
DeSanti

(10) Patent No.: US 9,686,210 B2
(45) Date of Patent: *Jun. 20, 2017

(54) CONTROLLER BASED FIBRE CHANNEL OVER ETHERNET (FCOE) FABRIC

(71) Applicant: CISCO TECHNOLOGY, INC., San Jose, CA (US)

(72) Inventor: Claudio DeSanti, Oakland, CA (US)

(73) Assignee: Cisco Technology, Inc., San Jose, CA (US)

(*) Notice: Subject to any disclaimer, the term of this patent is extended or adjusted under 35 U.S.C. 154(b) by 100 days.

This patent is subject to a terminal disclaimer.

(21) Appl. No.: 14/697,875

(22) Filed: Apr. 28, 2015

(65) Prior Publication Data

US 2016/0323204 A1    Nov. 3, 2016

(51) Int. Cl.
| | |
|---|---|
| *H04L 12/931* | (2013.01) |
| *H04L 29/06* | (2006.01) |
| *H04L 29/12* | (2006.01) |
| *H04L 12/741* | (2013.01) |

(52) U.S. Cl.
CPC ............ *H04L 49/357* (2013.01); *H04L 45/74* (2013.01); *H04L 49/70* (2013.01); *H04L 61/2038* (2013.01); *H04L 61/2076* (2013.01); *H04L 69/26* (2013.01); *H04L 61/6045* (2013.01)

(58) Field of Classification Search
None
See application file for complete search history.

(56) References Cited

U.S. PATENT DOCUMENTS

| | | | |
|---|---|---|---|
| 8,151,318 B1 | 4/2012 | Desanti et al. | |
| 8,514,856 B1 | 8/2013 | Gal et al. | |
| 8,948,176 B1 | 2/2015 | Desanti et al. | |
| 9,015,121 B1* | 4/2015 | Salamon | G06F 11/1438 707/640 |
| 2009/0116507 A1* | 5/2009 | Kanda | H04L 47/10 370/464 |
| 2011/0131576 A1* | 6/2011 | Ikegaya | G06F 9/455 718/1 |
| 2011/0296230 A1* | 12/2011 | Chen | H04L 49/357 714/3 |
| 2012/0099602 A1* | 4/2012 | Nagapudi | H04L 12/4633 370/401 |
| 2012/0106957 A1* | 5/2012 | Willeke | H04L 29/12207 398/58 |
| 2012/0177042 A1* | 7/2012 | Berman | H04L 12/4625 370/392 |
| 2012/0254554 A1* | 10/2012 | Nakajima | G06F 3/0607 711/154 |
| 2012/0275787 A1* | 11/2012 | Xiong | H04L 49/357 398/45 |

(Continued)

*Primary Examiner* — Ricky Ngo
*Assistant Examiner* — Michael Phillips
(74) *Attorney, Agent, or Firm* — Cindy Kaplan

(57) ABSTRACT

In one embodiment, a method includes establishing at a Fiber Channel over Ethernet (FCoE) Data-Plane Forwarder (FDF), a connection with a controller in communication with a plurality of FDFs, processing at the FDF, control information received from the controller, and forwarding FCoE frames based on the control information. The FDF communicates with the other FDFs in an FCoE fabric and communicates with the controller through a control connection. An apparatus is also disclosed herein.

19 Claims, 6 Drawing Sheets

(56) References Cited

U.S. PATENT DOCUMENTS

| | | | |
|---|---|---|---|
| 2014/0307578 A1* | 10/2014 | Desanti | H04L 41/0806 370/254 |
| 2015/0085867 A1 | 3/2015 | Desanti et al. | |
| 2015/0334053 A1* | 11/2015 | Fenkes | H04L 45/745 370/392 |
| 2016/0173338 A1* | 6/2016 | Wolting | H04L 41/145 709/223 |

* cited by examiner

CONTROLLER BASED FIBRE CHANNEL OVER ETHERNET (FCOE) FABRIC

TECHNICAL FIELD

The present disclosure relates generally to communication networks, and more particularly, to Fibre Channel over Ethernet (FCoE).

BACKGROUND

Fibre Channel (FC) is a protocol for connecting storage devices in a fabric network. Fibre Channel over Ethernet (FCoE) is a protocol that leverages Ethernet extensions that enable the establishment of lossless connections between Ethernet nodes. With FCoE, native FC frames are encapsulated in Ethernet frames so that Ethernet can become the physical layer of an FC based Storage Area Network (SAN). At an Ethernet receiving node, the native FC frames are decapsulated from the Ethernet frames and processed in accordance with the FC protocol. By deploying lossless capability in Ethernet, FC can be extended to Ethernet-capable network devices, thereby increasing the reach of FC connected devices.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
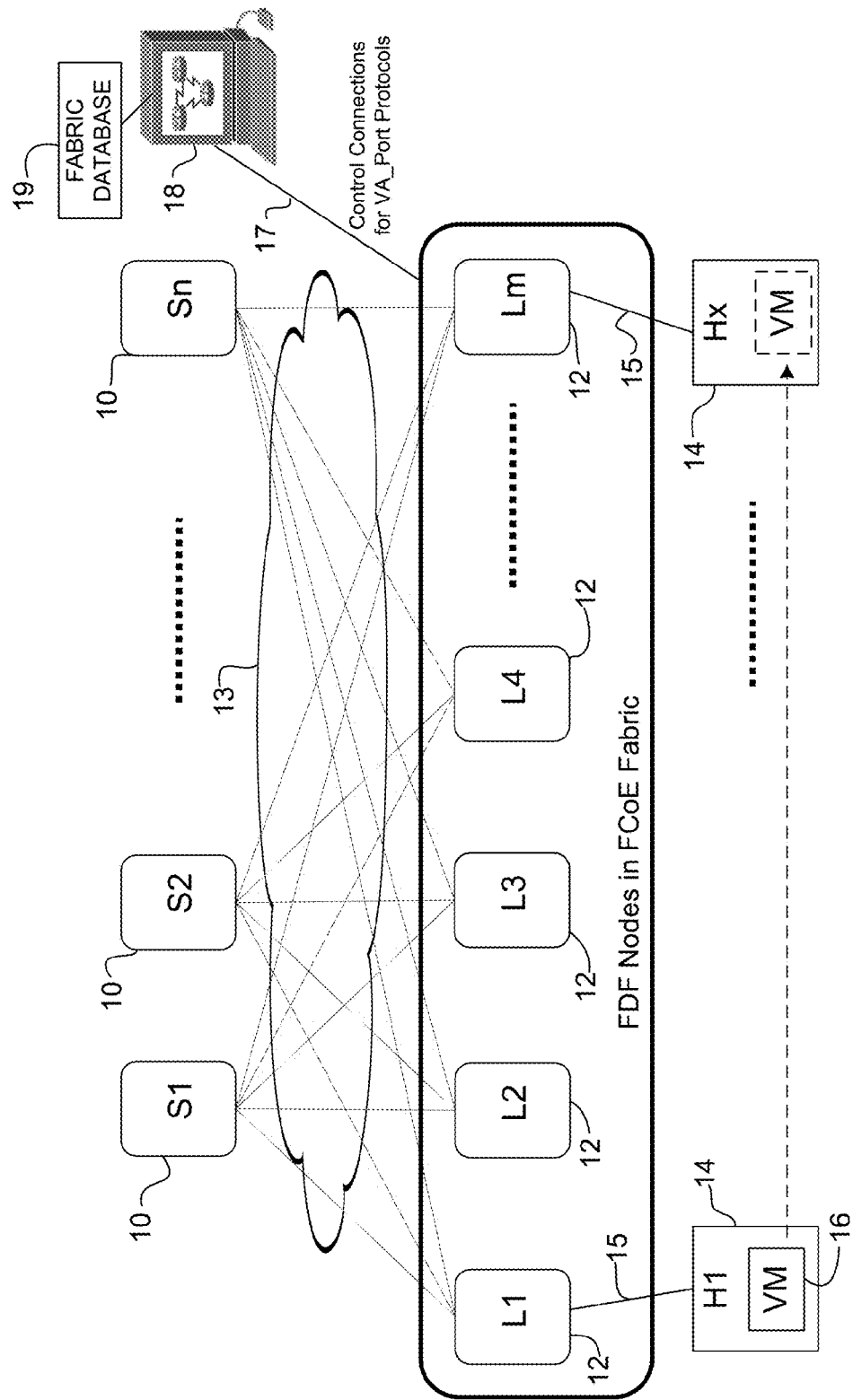
FIG. 1 illustrates an example of a network in which embodiments described herein may be implemented.

In one embodiment, a method generally comprises establishing at a Fibre Channel over Ethernet (FCoE) Data-Plane Forwarder (FDF), a connection with a controller in communication with a plurality of FDFs, processing at the FDF, control information received from the controller, and forwarding FCoE frames based on the control information. The FDF communicates with the other FDFs in an FCoE fabric and communicates with the controller through a control connection.

In another embodiment, an apparatus generally comprises a processor for establishing at a controller, connections with a plurality of Fibre Channel over Ethernet (FCoE) Data-Plane Forwarders (FDFs), computing route information for the FDFs, and transmitting the route information to the FDFs. The apparatus further comprises memory for storing a fabric database comprising the route information for the FDFs. The controller communicates with the FDFs through a control connection.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Fibre Channel (FC) fabrics are a collection of interconnected FC switches, with each switch managing its own subset of FC address space. At initialization time, a principal switch selection protocol and Domain_ID assignment protocol (as defined in FC-SW-x standards, for example) allocate to each switch of a fabric its own Domain_ID. In one example, the Domain_ID is the most significant byte of an FC address. An N_Port (Node Port) connected to a specific switch is assigned an FC address identifier belonging to the Domain_ID of that switch (e.g., an address identifier having the switch Domain_ID as the most significant byte). This type of FC address identifier allocation is topology dependent. For example, an N_Port is assigned an address based on which switch it is connected to. Thus, this method of address allocation and management does not operate well with Virtual Machines (VMs) that are subject to dynamic movement across a fabric.

Another issue with this conventional FC address assignment scheme is that it does not scale to a large fabric with a large number of switches. For example, an FC fabric operates by replicating a set of operational databases at every switch. Each database contains fabric-wide information that needs to be kept synchronized across the fabric. This poses practical limits to fabric size in terms of how many switches can compose a fabric. As described above, FC can be supported in Ethernet by encapsulating the FC in Ethernet (FCoE). However, Ethernet networks can scale to much larger sizes than FC fabrics. Layering FC over Ethernet may therefore create a significant network size mismatch problem.

The embodiments described herein leverage distributed switch protocols to define a scalable controller based FCoE fabric, which provides a virtual machine friendly and topology independent address assignment scheme. In one or more embodiments, backward compatibility functions may be provided to connect the controller based FCoE fabric to a conventional (legacy) FC or FCoE fabric. The embodiments provide a scalable system that may operate in an SDN (Software Defined Networking) context, provide mobility friendly address allocation, and support connectivity to existing FC or FCoE fabrics. As described in detail below, the embodiments implement an in-band functionality of a controlling switch, as defined, for example, by a distributed switch architecture, in an out-of-band controller.

The embodiments operate in the context of a Fibre Channel over Ethernet (FCoE) network. The following provides a brief description of an FCoE network and associated terminology, before referring to example embodiments.

In a Fibre Channel network, FC ports of FC nodes are designated as N_Ports (Node Ports). The N_Port is an end node port on the Fibre Channel fabric. The port may be a Host Bus Adapter (HBA) in a server or a target port on a storage array, for example. FC ports of FC switches are designated as F_Ports (Fabric Ports connected to N_Ports) or E_Ports (Expansion Ports connecting two switches). In an FCoE network, these constructs become virtual because ports of FCoE Nodes (ENodes) are Ethernet ports. Thus, the ports facing ENodes at a switch are VF_Ports (virtual F_Ports) and the ports at the ENodes are VN_Ports (virtual N_Ports). The ENode is an FC node that is able to transmit and receive FCoE frames using one or more ENode MACs. ENodes are the combination of FCoE termination functions and Fibre Channel stack on one or more Ethernet MACs, and in that sense are equivalent to host bus adapters (HBAs) in native FC networks.

Referring now to the drawings, and first to FIG. 1, a network in which embodiments described herein may be implemented is shown. For simplification, only a small number of nodes are shown. The network comprises a plurality of spine switches (S1, S2 . . . Sn) 10 in communication with a plurality of leaf switches (L1, L2, L3, L4 . . . Lm) 12 in a spine-leaf topology. As described below, the leaf switches 12 operate as FCoE Data-Plane Forwarders (FDFs) to provide FDF functions in an FCoE fabric. The FDFs 12 may be in communication with any number of hosts (H1 . . . Hx) 14. Each host 14 (end node, server) may host any number of virtual machines (VMs) 16. The network may include any number of edge devices or intermediate (core) nodes (e.g., switches, access layer devices, aggregation layer devices, or other network devices), which facilitate passage of data within the network. The spine-leaf topology shown in FIG. 1 may include any number of spine nodes 10 and leaf nodes 12 and each leaf node 12 may be in communication with any number of hosts (servers, virtual machines).

The host 14 may be, for example, a server or any other type of network device, including devices operable to host virtual machines 16. The host 14 may be implemented as various combinations of computing elements and other network elements. The virtual machines 16 may be moved (referred to, for example, as virtual machine mobility, vMotion, live migration, or virtual machine migration) between hosts 14 (as shown in FIG. 1) based on traffic patterns, hardware resources, or other criteria.

The controller based FCoE operations described herein are based on implementing FCoE functionality on the leaf switches 12. The spine (core) switches 10 forward the FCoE frames as Ethernet frames in a lossless and in-order manner. The leaf nodes 12 do not need to implement full FCF (FCoE Forwarder) functionality (i.e., the full functionality of an FC switch, including address assignment and management). The leaf nodes 12 operate as FDFs (the FCoE version of FCDFs (FC Data-Plane Forwarders)) providing VF_Port connectivity to the network devices 14 (VN_Ports) connected to them.

The FDF 12 is a simplified FCoE switching entity that is configured primarily to pass data from a given connected host 14 (via VN_Port to VF_Port virtual link 15) to another network device (e.g., switch 10) via lossless Ethernet network 13. The FDFs 12 are in communication with a controller 18 operable to centrally manage the FDFs, as described further below.

The FDF 12 forwards FCoE frames in accordance with FCoE rules and may support both Ethernet interfaces and native Fibre Channel interfaces. The FDF 12 is the combination of FCoE termination functions and Fibre Channel switching functions on one or more Ethernet MACs and therefore, may be considered functionally equivalent to a Fibre Channel switch in a native FC network. As described below, the FDFs 12 may instantiate VA_Port (Virtual Adjacent Port) to VA_Port virtual links between themselves, as well as between respective ones of themselves and the controller 18. The VA_Port is a virtual A_Port, which refers to an instance of an FC-2V sublevel of Fibre Channel that communicates with another VA_Port. VA_Port to VA_Port virtual links enable FCoE frame forwarding between the controller 18 and FDFs 12, as well as between FDFs. VA_Port to VA_Port virtual links are used to exchange control information between the controller 18 and FDFs 12 through VA_Port protocols.

VA_Port protocols may be used to encapsulate FC frames in FCoE and transmit them from the leaf switches 12 to the controller 18 over virtual link (control connection) 17 (FIG. 1). The FC Frames may also be carried in a TCP/IP context or any other type of encapsulation may be used.

The FDFs 12 may discover each other through an FCoE Initialization Protocol (FIP) discovery protocol. The FDF 12 includes suitable logic, interfaces, code, or circuits operable to encapsulate FC frames into FCoE frames, decapsulate FCoE frames into FC frames, and perform Ethernet switching operations. The FDF 12 is also configured to forward FCoE frames from one host 14 to another host. The FDFs 12 perform data plane functions including forwarding FCoE frames based on instructions received from the controller 18.

The controller 18 may be a network device, group of network devices, or distributed among any number of network devices to form a centralized controller. The controller 18 may be, for example, a Cisco Application Policy Infrastructure Controller (APIC), CiscoOne controller, an SDN controller (e.g., controller based on OpenDaylight architecture), or any other network device operable to perform controller functions as described herein. The controller 18 centrally and consistently manages assignment of FC addresses and establishment of appropriate routes to forward frames addressed to them. The controller 18 may manage Fibre Channel parameters and centralize control plane functions including, for example, address assignment, route computations, and access control computations on behalf of the FDFs 12. The controller 18 may, for example, control allocation of N_Port identifiers (IDs) to N_Ports connected to the FDFs 12, maintain a topology map, and compute and distribute virtual domain routes for the FDFs.

It is to be understood that the network shown in FIG. 1 is only an example and that the embodiments described herein may be implemented in other networks having other network topologies or network devices, without departing from the scope of the embodiments. For example, there may be any number of network devices (e.g., gateways, routers, switches) or networks interposed between the nodes. One or more network devices may also be located between the FDFs 12 and the hosts 14.

Figure 2:
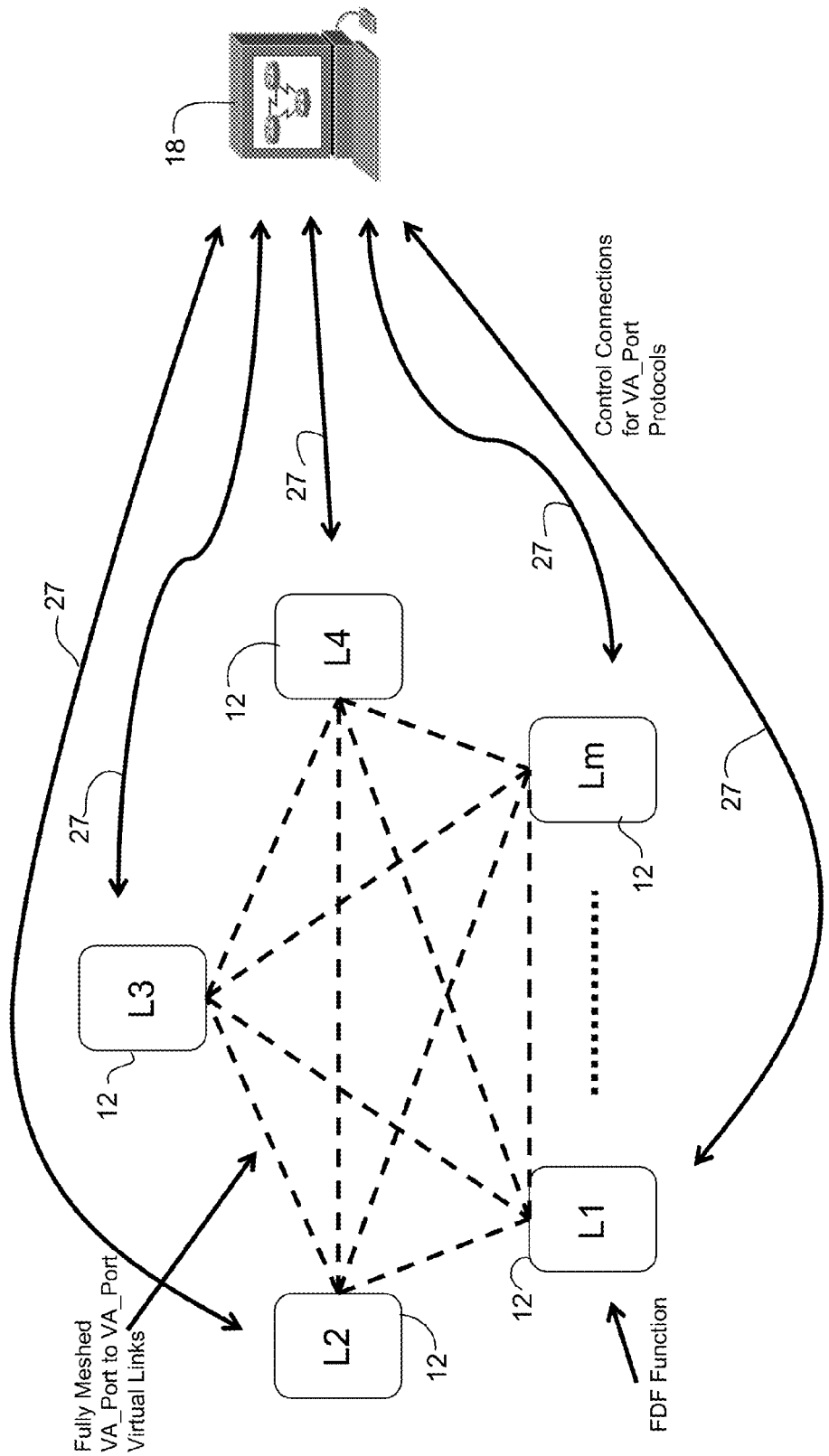
FIG. 2 illustrates logical connectivity of the network shown in FIG. 1.

FIG. 2 illustrates FCoE logical connectivity of the network shown in FIG. 1. From an internal connectivity standpoint, the leaf switches 12 establish a full mesh of VA_Port to VA_Port virtual links among themselves. These VA_Port to VA_Port virtual links are used to forward FCoE frames across the network. The control protocol interactions take place through a control connection (e.g., on an out-of-band channel) 27 between each FDF 12 and the controller 18.

The term "out-of-band" as used herein refers to communication between the FDFs 12 and controller 18 separate from a distributed switch architecture defining the set of switches in the FCoE fabric. Rather than control communications taking place in-band within the distributed switch architecture, communications between the FDFs 12 and controller 18 take place through a control connection (e.g., on an out-of-band channel).

The VA_Port protocols enable proper operation once VA_Port to VA_Port virtual links are established. When becoming operational, the FDF 12 may establish a connection with the controller 18 in order to set up proper control connections for VA_Port protocols 17, 27 (FIGS. 1 and 2). Upon instantiating the control connection, the FDF 12 receives proper forwarding information from the controller 18 through the VA_Port protocols and is then able to set up proper forwarding tables to forward FCoE frames. The FDF 12 may then enable its VF_Port capable FCF-MACs for FIP discovery and FIP logins from ENodes (FCoE nodes).

In one embodiment, upon establishing a connection with the FDF 12, the controller 18 may recompute N_Port_ID routing information including the FDF and distribute updated routing information to all FDFs. When a connection with the FDF 12 is removed (i.e., upon de-instantiating a VA_Port to VA_Port virtual link), the controller 18 may recompute the N_Port_ID routing information without the FDF 12 and distribute the updated routing information to the FDFs. Upon receiving a Fabric Login request from a VN_Port, the FDF 12 may send a message to the controller 18 to indicate reachability of that VN_Port. The controller 18 may then allocate an N_Port_ID for the N_Port from the virtual Domain_ID and distribute the allocated N_Port_ID to the FDFs 12. Similarly, when a VN_Port becomes unreachable, the FDF 12 may send a message to notify the controller 18. The controller 18 may then de-register the information associated with the unreachable node and update the FDFs 12.

In one embodiment, information may be transmitted between the FDFs 12 and controller 18 using messages including, for example, VN_Port Reachability Notification, VN_Port Unreachability Notification, FDF Reachability Notification, FDF Unreachability Notification, N_Port_ID Route Distribution, N_Port_ID and Zoning ACL (Access Control List) Distribution, Active Zoning ACL Distribution, and Switch Membership Distribution. It is to be understood that the VA_Port protocols described herein are only examples and that other protocols or messages may be used for communication between the FDFs 12 and controller 18 on an out-of-band channel.

One or more virtual Domain_IDs may be used to allocate FC addresses. In this way address allocation is not tied to a specific leaf switch 12, but instead completely flat and location independent. If a virtual machine 16 moves (e.g., from host H1 in to host Hx as shown in FIG. 1), the VM can log out from the fabric before performing the move and then re-login when the move is complete and the VM 16 will have the same FC address assigned as before the move.

Topology and routing information as well as Fibre Channel Name Server information may be stored in fabric database 19 at the controller 18 (FIG. 1). Since management and control functions for the FCoE are provided by the controller 18, there is no need to replicate the entire database 19 at each switch 12 of the fabric. Each leaf switch 12 receives from the controller 18 a subset of the fabric information that the switch will need for proper operation. The controller also takes care of providing state change notifications information to the end devices. This resolves the FC scalability issues described above.

Figure 3:
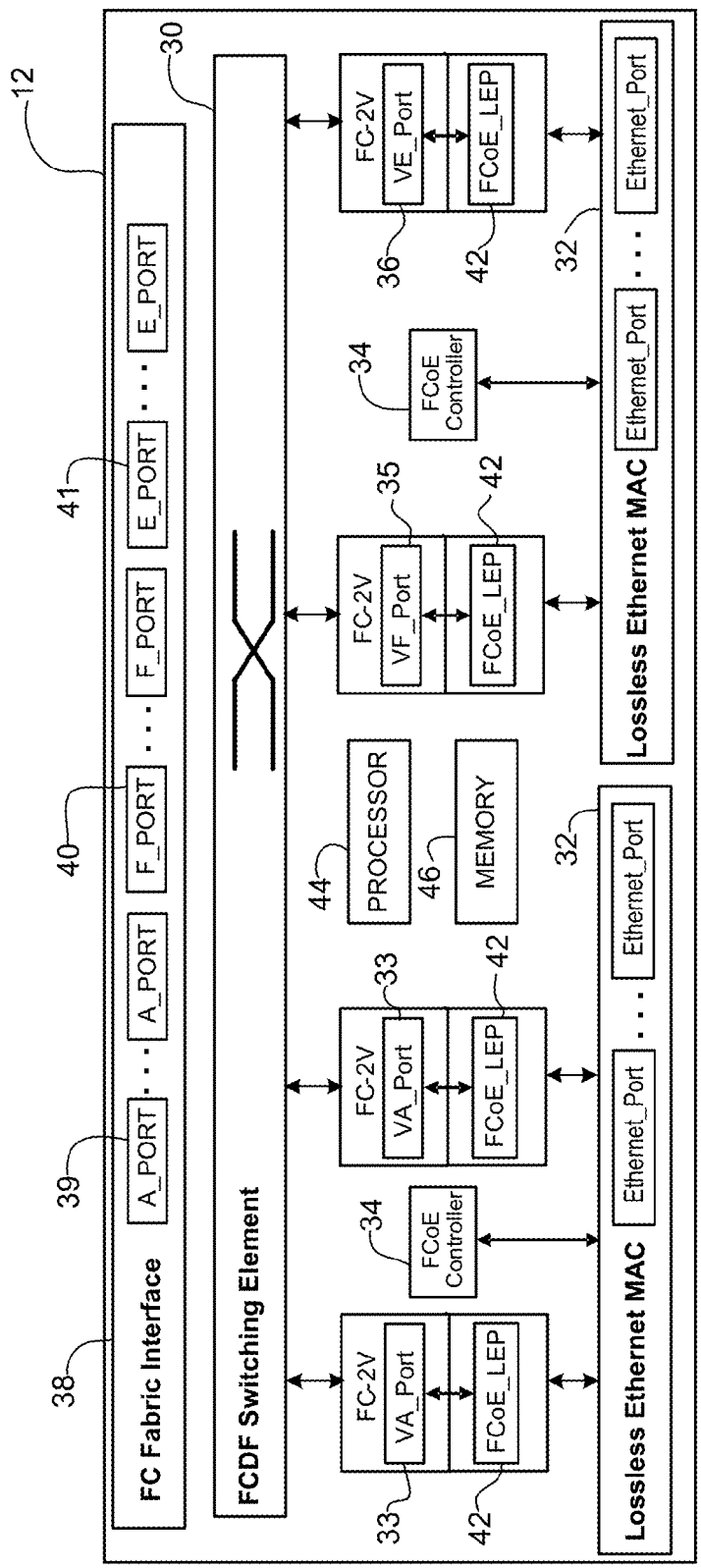
FIG. 3 depicts an example of a network device useful in implementing embodiments described herein.

FIG. 3 illustrates an example of a functional model (block diagram) of the leaf switch (FDF) 12 in FIG. 1. The FDF 12 comprises a Fiber Channel Data Plane Forwarder (FCDF) switching element 30 and one or more lossless Ethernet MAC (FDF-MAC) 32. Each FDF-MAC 32 is coupled with an FCoE controller 34 and may also be coupled with a lossless Ethernet bridging element (not shown). The FDF 12 may support instantiation of VA_Ports 33, VF_Ports 35, or VE_Ports 36 over its FDF-MACs 32. The switching element 30 may be coupled with a Fibre Channel fabric interface 38, providing native A_Port 39, F_Port 40, and E_Port 41 connectivity.

The FDF 12 may comprise any number of interfaces (linecards, ports) for receiving data or transmitting data to other devices. The network interfaces may be configured to transmit or receive data using a variety of different communication protocols and may include mechanical, electrical, and signaling circuitry for communicating data over physical links coupled to the network.

Virtual and non-virtual ports communicate through the switching element 30. The FCoE controller 34 performs an FCoE Initialization Protocol (FIP) and instantiates or de-instantiates VA_Port/FCoE_LEP (Link End-Point), VF_Port/FCoE_LEP, or VE_Port/FCoE_LEP pairs as needed.

FCoE_LEP 42 is a functional entity performing encapsulation of FC frames into FCoE frames in transmission and decapsulation of FCoE frames into FC frames in reception. The FCoE_LEP 42 operates according to the MAC address of the local link end-point and the MAC address of the remote link end-point. When encapsulating FC frames into FCoE frames, the MAC address of the local link end-point is used as source address and the MAC address of the remote link end-point is used as destination address of the generated FCoE frame. When decapsulating FC frames from FCoE frames, the FCoE_LEP 42 verifies that the destination address of the received FCoE frame is equal to the MAC address of the local link end-point and verifies that the source address of the received FCoE frame is equal to the MAC address of the remote link end-point. If either check fails the FCoE frame may be discarded.

The FDF 12 may be implemented in hardware, software, or any combination thereof. The FCoE controller 34 and other components of the FDF 12 depicted in FIG. 3 may be implemented using processor 44 and associated memory 46. Memory 46 may be a volatile memory or non-volatile storage, which stores various applications, operating systems, modules, and data for execution and use by the processor 44. For example, memory 46 may be any type of tangible processor readable memory device that is encoded with or stores instructions that can implement the functionality of FDF 12.

Process logic may be embodied in one or more computer readable storage media that is encoded with instructions for execution by processor 44 that, when executed by the processor are operable to cause the processor to perform the functions described herein. For example, the processor 44 may execute codes stored in a computer-readable medium such as memory 46. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The computer-readable medium may be a non-transitory computer readable medium.

It is to be understood that the network device 12 shown in FIG. 3 and described above is only an example and that different configurations of network devices may be used, without departing from the scope of the embodiments. For example, if the leaf node 12 is not operating as a gateway node, as described below with respect to FIG. 4, the network device does not need to include E_Port 41 or VE_Port 36 interfaces. The network device may further include any suitable combination of hardware, software, algorithms, processors, devices, components, or elements operable to facilitate the capabilities described herein.

In order to implement backward compatibility with a conventional FC or FCoE fabric, one or more leaf switches 12 may be designated as a gateway switch to provide E_Port or VE_Port connectivity, respectively. In the example shown in FIG. 4, switches L1 and Lm are configured to provide gateway functions to connect the controller based fabric (shown in FIGS. 1 and 2) with a conventional FCoE fabric 48 using VE_Port to VE_Port virtual links. The E_Port protocol processing is deferred to the controller 18 in the same way in which the VA_Port protocol processing inside the controller based fabric is deferred to the controller. The controller 18 processes the E_Port protocols on behalf of the gateway switch. The E_Port protocols are carried from the gateway switch 12 to the controller 18 through the out-of-band channel 27.

Figure 4:
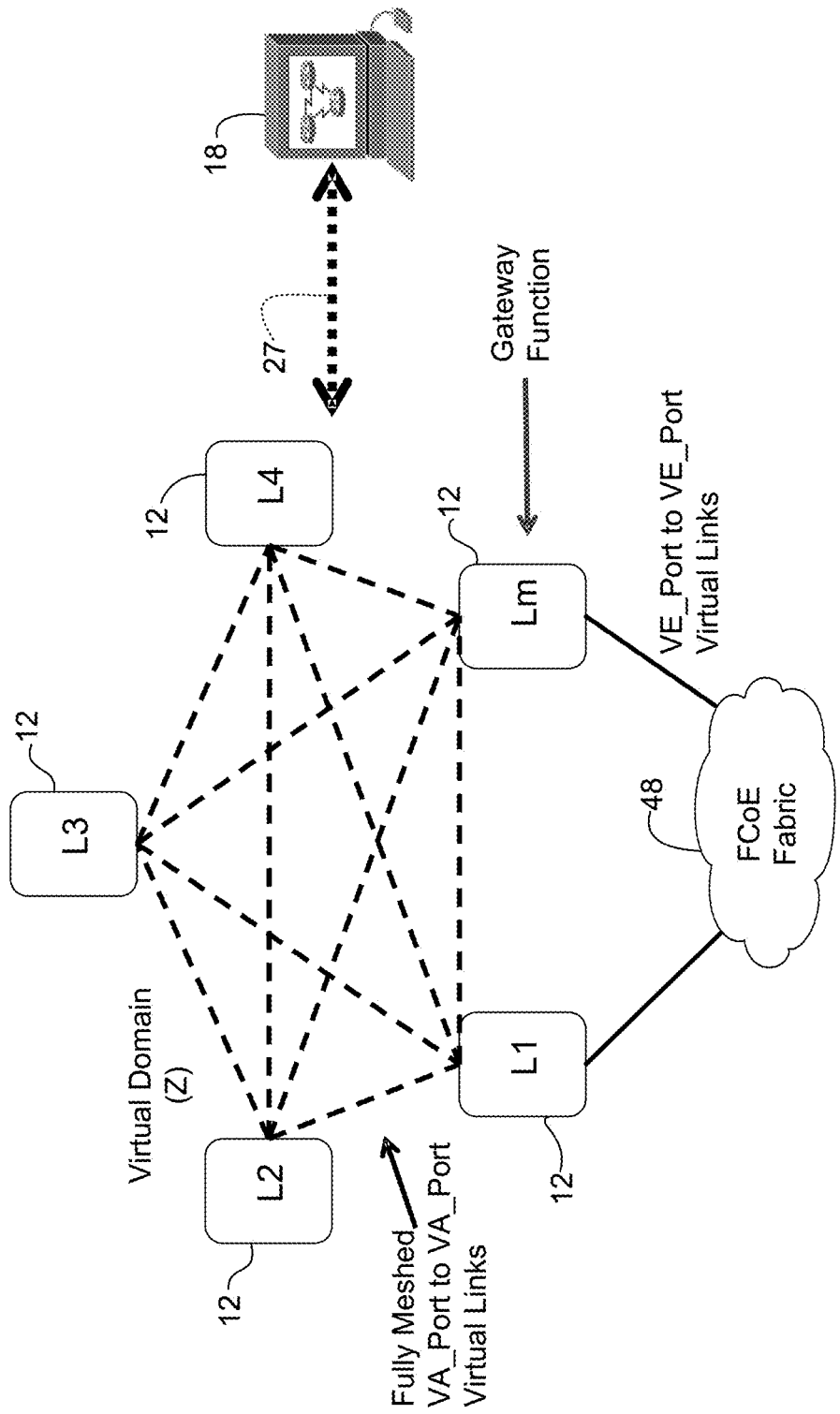
FIG. 4 illustrates connectivity with a legacy FCoE (Fibre Channel over Ethernet) fabric.
Figure 5:
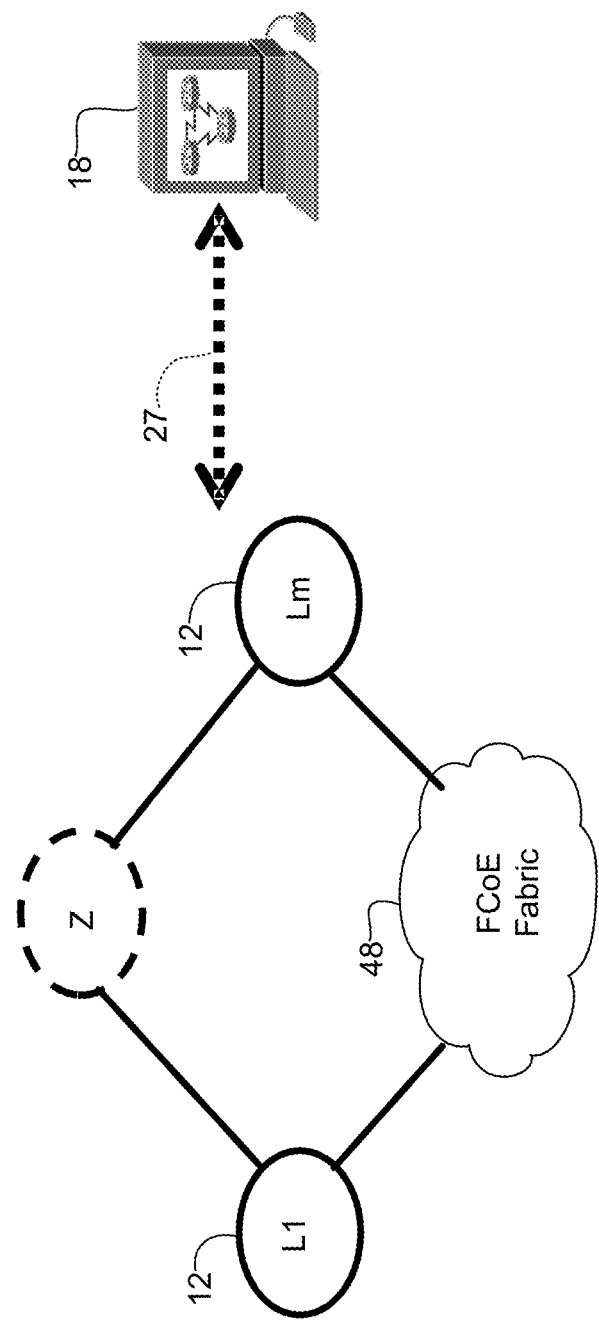
FIG. 5 illustrates an FSPF (Fabric Shortest Path First) representation of a virtual domain shown in FIG. 4.

FIG. 5 illustrates an FSPF (Fabric Shortest Path First) representation of the virtual domain (Z) shown in FIG. 4. In one embodiment, the controller 18 acquires one Domain_ID per each gateway switch 12 to present and model them to the FSPF protocol topology. The FSPF protocol is used to build routing tables for each of the FDFs 12. FSPF computes paths with the minimal cost as the best paths for communications across the fabric. Based on announcements received from the FDFs 12, FSPF is able to recognize the Domain_IDs of the FDFs. One or more virtual Domain_IDs used by the controller based fabric are modeled in FSPF as connected to each gateway switch.

Figure 6:
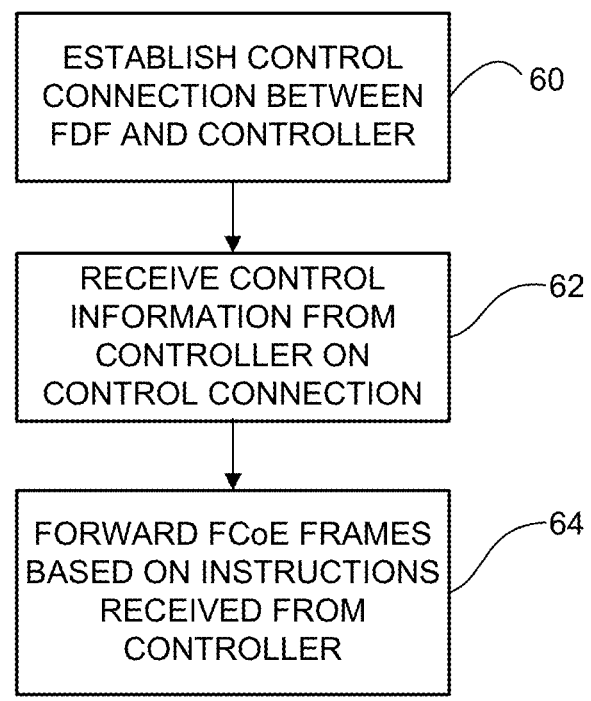
FIG. 6 is a flowchart illustrating an overview of a process for implementing a controller based FCoE fabric, in accordance with one embodiment.

FIG. 6 is a flowchart illustrating an overview of a process at the FDF 12 for implementing a controller based FCoE fabric, in accordance with one embodiment. At step 60, a control connection is established between the FDF 12 and controller 18 (FIGS. 1 and 6). Respective connections may be instantiated between the controller 18 and the plurality of FDFs and between individual FDFs 12. The FDF 12 may become operational upon receiving a message over a VA_Port to VA_Port virtual link 17 from the controller 18, for example. The FDF 12 receives control information from the controller 18 through the control connection (e.g., on an out-of-band channel) (step 62).

The control information may include, for example, address assignments and route information. FDF N_Port_ID routes may be defined upon receiving route distribution messages from the controller 18. The FDF performs data plane functions including forwarding FCoE frames based on instructions received from the controller 18 (step 64). For example, upon receiving an FCoE frame on a virtual link, the FDF 12 confirms that the destination MAC address is its FDF-MAC address. The FCoE frame is then forwarded over another virtual link based on the destination address identifier of the FC frame encapsulated in the FCoE frame. The FDF communicates in-band with the plurality of FDFs in the FCoE fabric and communicates out-of-band with the controller 18.

It is to be understood that the process illustrated in FIG. 6 is only an example and that steps may be added or modified without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   establishing at a Fibre Channel over Ethernet (FCoE) Data-Plane Forwarder (FDF), an out-of-band connection with a controller in communication with a plurality of FDFs in an FCoE fabric;
   assigning at least one Domain identifier to represent said plurality of FDFs, wherein Fibre Channel addresses are allocated using said at least one Domain identifier;
   processing at the FDF, control information received from the controller; and
   forwarding FCoE frames based on said control information;
   wherein the FDF communicates in-band with said plurality of FDFs in the FCoE fabric and communicates with the controller through said out-of-band connection; and
   wherein the FDF is in communication with a network device hosting a virtual machine moved from another network device in communication with one of said plurality of FDFs and wherein the virtual machine is assigned the same Fibre Channel address it was assigned before moving.

2. The method of claim 1 wherein the FDF communicates with said plurality of FDFs and the controller using a virtual adjacent port (VA_Port) protocol.

3. The method of claim 1 wherein said control information is received from the controller via said out-of-band connection established between the controller and the FDF.

4. The method of claim 1 wherein said control information comprises the Fibre Channel addresses and route information.

5. The method of claim 1 wherein the controller comprises a Software Defined Networking (SDN) controller.

6. The method of claim 1 wherein the FDFs comprise leaf switches in communication with at least one spine switch operable to forward the FCoE frames as Ethernet frames.

7. The method of claim 1 wherein the FDF comprises a gateway function controlled by the controller in communication with a Fibre Channel (FC) fabric or the FCoE fabric.

8. The method of claim 7 wherein the FDF is in communication with the FC fabric or the FCoE fabric via an E_Port or VE_Port, respectively.

9. An apparatus comprising:
   a processor for establishing at a controller, out-of-band connections with a plurality of Fibre Channel over Ethernet (FCoE) Data-Plane Forwarders (FDFs) in an FCoE fabric, computing route information for said plurality of FDFs, and transmitting said route information to said plurality of FDFs; and
   memory for storing a fabric database comprising said route information for said plurality of FDFs;
   wherein said plurality of FDFs communicate in-band in the FCoE fabric and the controller communicates with said plurality of FDFs through said out-of-band connections;
   wherein at least one Domain identifier is assigned to represent said plurality of FDFs and Fibre Channel addresses are allocated using said at least one Domain identifier; and
   wherein the processor is further operable to assign a same Fibre Channel address to a virtual machine following a move of the virtual machine between network devices connected to different FDFs in said plurality of FDFs.

10. The apparatus of claim 9 wherein transmitting said route information comprises transmitting a subset of route information from the fabric database to each of said plurality of FDFs.

11. The apparatus of claim 9 wherein the controller comprises a Software Defined Networking (SDN) controller.

12. The apparatus of claim 9 wherein the controller is operable to communicate with said plurality of FDFs using a virtual adjacent port (VA_Port) protocol.

13. An apparatus comprising:
a processor for establishing at a Fibre Channel over Ethernet (FCoE) Data-Plane Forwarder (FDF) an out-of-band connection with a controller in communication with a plurality of FDFs in an FCoE fabric, assigning at least one Domain identifier to represent said plurality of FDFs, processing control information received from the controller, and forwarding FCoE frames based on said control information; and
memory for storing said control information;
wherein the FDF communicates in-band with said plurality of FDFs in the FCoE fabric and communicates with the controller through said out-of-band connection;
wherein Fibre Channel addresses are allocated using said at least one Domain identifier; and
wherein the FDF is configured for communication with a network device hosting a virtual machine moved from another network device in communication with one of said plurality of FDFs and wherein the virtual machine is assigned the same Fibre Channel address it was assigned before moving.

14. The apparatus of claim 13 wherein the processor is operable to communicate with said plurality of FDFs and the controller using a virtual adjacent port (VA_Port) protocol.

15. The apparatus of claim 13 wherein said control information comprises the Fibre Channel addresses and route information.

16. The apparatus of claim 13 wherein the FDF comprises a gateway function controlled by the controller operable to communicate with a Fibre Channel (FC) fabric or the FCoE fabric via an E_Port or VE_Port, respectively.

17. The apparatus of claim 13 wherein the processor is configured to process said control information received from the controller via said out-of-band connection established between the controller and the FDF.

18. The apparatus of claim 13 wherein the controller comprises a Software Defined Networking (SDN) controller.

19. The apparatus of claim 13 wherein the FDFs comprise leaf switches in communication with at least one spine switch operable to forward the FCoE frames as Ethernet frames.

* * * * *